US005638887A

United States Patent [19]

Didion

[11] Patent Number: 5,638,887

[45] Date of Patent: Jun. 17, 1997

[54] TUMBLING UNIT HAVING CYLINDRICAL LINER

[75] Inventor: Michael S. Didion, St. Charles, Mo.

[73] Assignee: Nidion Manufacturing Company, St. Peters, Mo.

[21] Appl. No.: 422,810

[22] Filed: Apr. 17, 1995

[51] Int. Cl.$^{6}$ .......... B02C 17/22; B22D 29/00; F16B 3/00

[52] U.S. Cl. .......... 164/269; 164/404; 241/182; 241/299; 403/294; 403/357

[58] Field of Search .......... 164/269, 401, 164/404; 403/24, 294, 357; 241/DIG. 10, 182, 299

[56] References Cited

U.S. PATENT DOCUMENTS

| | | | |
|---|---|---|---|
| 637,024 | 11/1899 | Penwell | 403/294 X |
| 1,920,021 | 7/1933 | Schroeder . | |
| 1,998,649 | 4/1935 | Arden . | |
| 2,249,872 | 7/1941 | Turner . | |
| 2,993,714 | 7/1961 | Junghanns | 403/357 X |
| 3,369,425 | 2/1968 | Runkle et al. . | |
| 3,438,660 | 4/1969 | Steiner . | |
| 3,998,262 | 12/1976 | Didion . | |
| 4,502,808 | 3/1985 | Didion et al. . | |

FOREIGN PATENT DOCUMENTS

| | | | |
|---|---|---|---|
| 69289 | 5/1949 | Denmark . | |
| 3-103603 | 4/1991 | Japan | 403/357 |
| 1073147 | 6/1967 | United Kingdom . | |

*Primary Examiner*—J. Reed Batten, Jr.
*Attorney, Agent, or Firm*—Paul M. Denk

[57] ABSTRACT

A retaining rod is provided for forcing a tight interfit between adjacent segments of a liner of a casting shake-out unit, sand reclaimer, rotary media drum, or a tumbling unit. The adjacent edges of the liner segments have triangular grooves which combine to create diamond shaped channels between adjacent segments of the liner. The rod is generally diamond shaped in cross-section and tapered from front to back, giving the rod an overall trapezoidal appearance. The cross-sectional height of the rod is greater than the cross-sectional width of the rod. Thus, the rod can be placed in the channel in one of two positions and the same rod may be used if the clearance between adjacent segments is large or small simply by rotating the rod 90°.

10 Claims, 2 Drawing Sheets

TUMBLING UNIT HAVING CYLINDRICAL LINER

BACKGROUND OF THE APPLICATION

This invention relates to retention pins used to retain liner segments of tumbling mills, such as casting shake-out units, dual sand reclaimers, lump crushers, media drums, and the like, in place and in particular to a double sided retention pin which may be used in two positions in the tumbling mill.

Casting shake-out units and other types of tumbling mills frequently have inner linings formed from liner segments. When individual segments wear out, the segments can be replaced easily and rapidly without incurring a significant amount of machinery or plant down time. Further, the liner can be repaired without having to replace the entire lining. An example of such a unit is disclosed in U.S. Pat. No. 3,998,262 which shows a segmented inner cylinder or liner for a casting shake-out unit. As explained therein, the internal cylinder forming the inner surface of the unit is constructed from a series of modular components. The components or segments fit together to form the lining of the shake-out unit. The operation of that particular unit, for its purpose, has performed highly satisfactorily. However, when the casting shake-out unit is operated continuously, the wear from the continuous operation can cause the liner segments to gradually loosen. The segments must then be retightened by welding the segments together. If the segments are not retightened, the segments could eventually separate, causing the lining to come apart.

This situation was remedied by the retention pin system disclosed in U.S. Pat. No. 4,502,808, which is assigned to the same assignee as the present invention, and which is incorporated herein by reference. As disclosed in that patent, the liner segments are provided with rectangular channels along adjacent edges of the liner segments. Retention pins are received in the channels to urge the liner segments apart, thereby creating a tight interfit among the segments. The pin or rod disclosed therein is formed having a series of inherent angular bends and is constructed of resilient material. The rod thus has a slight spring quality. As the rod is forcefully inserted in place in the channels between pairs of liner segments, the rod acts to exert a pressure against adjacent segments to assure their tightness in interfitting together to form the liner for the a casting shake-out unit or the like. However, when the segments are formed, the clearance between adjacent segments is not constant. Thus, depending on the size of the clearance, the retention rod may be too large to fit in the channel between the segments, or the rod may be too small, and may not operate to properly tighten the liner in place.

SUMMARY OF THE INVENTION

One object of the present invention is to provide a retention pin which assures retention of at least contiguous segments of a casting shake-out unit, and other types of tumbling mills, together by pressuring the segments, instead of welding the segments, into a tight interfitting relationship regardless of the wear that may be encountered during prolonged use of the unit in which the segments are embodied.

Another object is to provide such a retention pin which may be used between adjacent segments when the clearance between adjacent segments varies.

Another object is to provide such a retention pin which may be used in more than one orientation.

These and other objects will become apparent to those skilled in the art in light of the following disclosure and accompanying drawings.

In accordance with the invention, generally stated, a retention pin is provided for a casting shake-out unit to hold segments of the lining in place to form a tightly and securely interfitting lining for the unit. The casting shake-out unit includes a cylindrical outer shell and a cylindrical lining positioned within the outer shell. The lining is formed of a series of interfitting segments which form a plurality of rows to define the complete lining. The segments have edges adjacent each other. The adjacent edges of each segment has a generally triangular groove which extends the length of the segment edge. When the segments are positioned adjacent each other, the grooves form diamond-shaped channels between adjacent segments. A diamond-shaped retaining rod of the present invention is inserted in the channel to urge the adjacent segments apart to form a tight interfit among the segments in a row of the lining. The retaining rod has a front face, a back face, sides, and a height and a width. The sides are generally trapezoidal in shape and define taper such that the back face has a larger surface area than the front face. The rod is thus trapezoidal in overall shape. The sides of the rod are not equal in width, and thus the cross-sectional height of the rod is greater than its cross-sectional width. The retaining rod is insertable in the channel in two different positions depending on the clearance between the adjacent segments. The retaining rod is inserted in the channel in a first position in which the rod's height dimension is generally co-planar with the adjacent segments when the clearance between the segments is larger. When the clearance between the segments is smaller, the retaining rod is inserted in the channel in a second position in which the rod width dimension is generally co-planar with the adjacent segments. The taper of the sides of the rod between the front face and back face is a taper of about 2°. The surface area of the back face is about 2.2 times the surface area of the front face. The cross-sectional width of the rod is about 80%–85% of the cross-sectional height of rod.

DESCRIPTION OF THE PREFERRED EMBODIMENT

Figure 1:
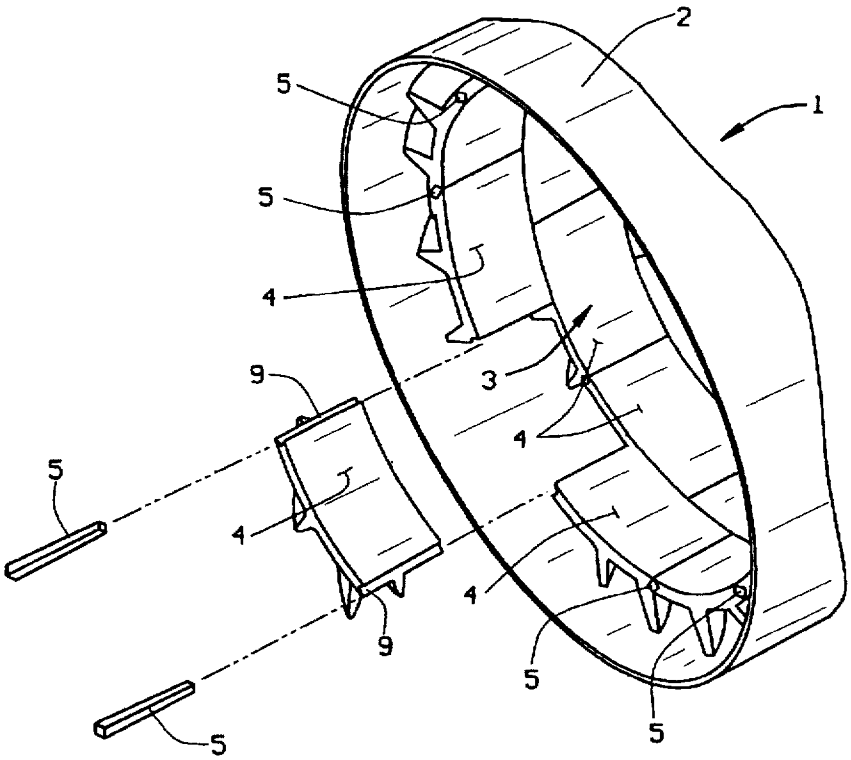
FIG. 1 is a partial view of one end of a casting shake-out unit showing, in an exploded view, one removed liner segment and the retention rods of the present invention that secure the liner segment into a liner surface.

A shake-out unit 1 is shown in part in FIG. 1. The shake-out unit 1 includes an outer cylinder 2 and an inner cylindrical surface or liner 3. The liner 3 is made of a plurality of interfitting segments 4 which mate together to form the inner cylindrical surface 3 for the shake-out unit. A retention rod 5 is provided, as will be explained below, to urge the segments 4 into a tight interfitting relationship to secure the liner segments in place in the unit 1. As will be apparent, the inventive concept of this invention, although explained in association with a casting shake-out unit, has utility in rotating media drums, tumbling mills, sand reclaiming units, or other similar devices.

Figure 2:
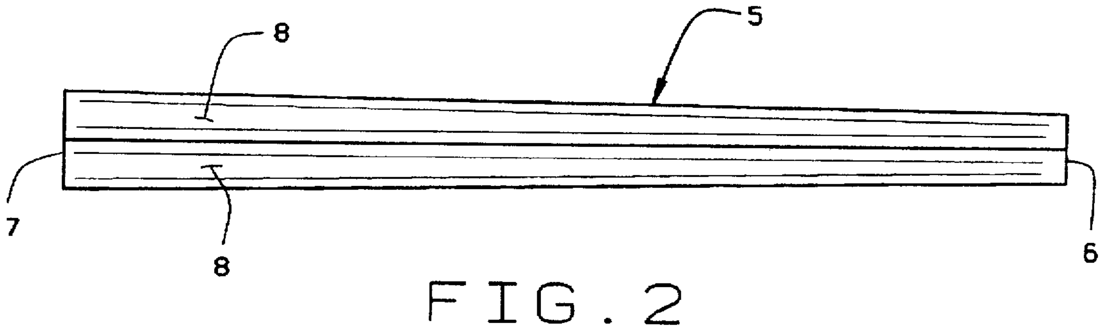
FIG. 2 is side elevational view of the retention rod.
Figure 3:
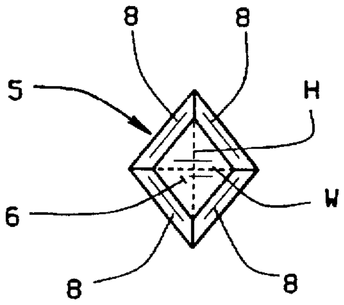
FIG. 3 is a front elevational view of the retention rod.

The rod 5 is shown in more detail in FIGS. 2 and 3. The rods 5 have a front surface or face 6, a back surface or face 7, and sides 8. The rods 5 are formed having a length equal to or slightly less than the length of each segment 4. Each rod is formed to be generally diamond shaped in vertical cross-section. The cross-sectional width W and height H of the rod 5 are thus not the same and the sides 8 of the rod are not all of the same dimension. Opposing sides are of the same width, however, adjacent sides of the rod do not have the same width, and the cross-sectional height and width of the rod are different. Preferably, the cross-sectional width W of the rod is about 80%–85% of the cross-sectional height H of the rod. The sides 8 of the rod 5 are generally trapezoidal in shape and thus taper, preferably evenly, from front to back. The taper is preferably a taper of about 2° and the back surface 7 has a surface area that is about 2.2 times the surface area of the front surface 6. The rod is cast so that its front surface is centered with respect to the back surface. The rod 5 is preferably made from DMC-415 cast ductile iron.

Figure 4:
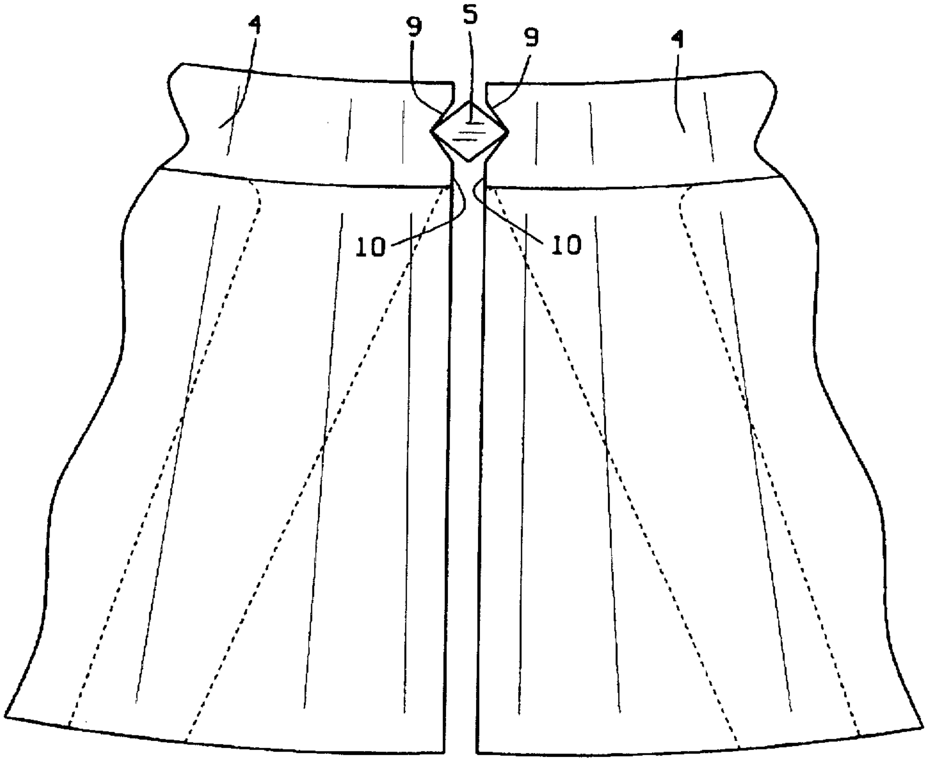
FIG. 4 is an end view showing the retention rod in place in a first orientation between to liner segments.
Figure 5:
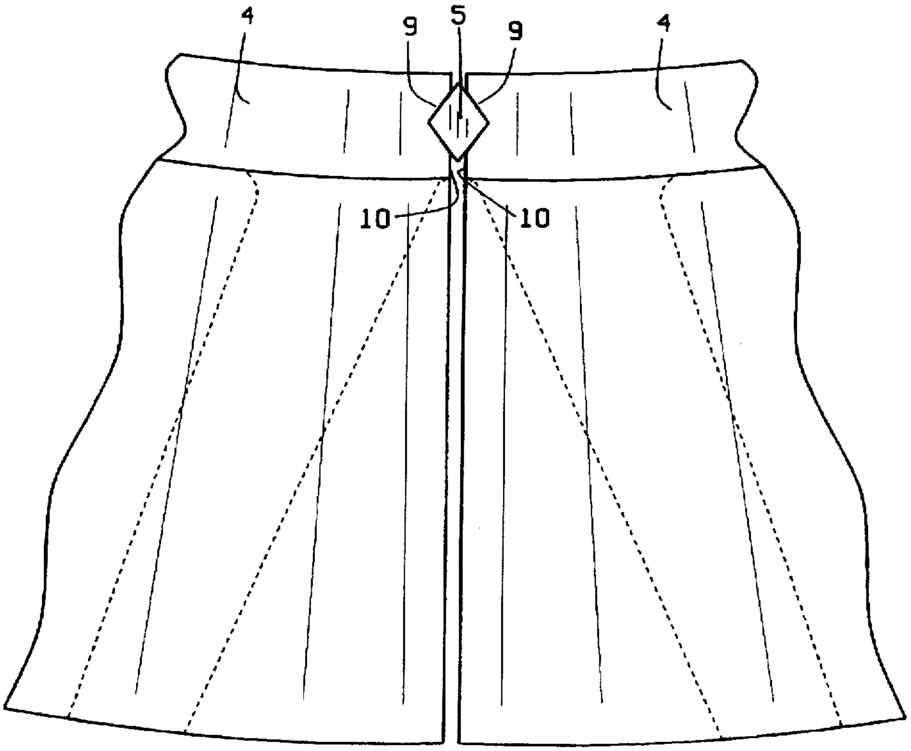
FIG. 5 is an end view showing the retention rod in a second orientation.

The liner segments 4 are shown in end view in FIGS. 4 and 5. Each liner segment 4 is formed having a groove or slot 9 formed along the side edges 10 which are placed adjacent each other when the liner 3 is formed. The grooves or slots 9 are generally triangular, such that when the segments 4 are brought together, the slots combine to form a generally diamond shaped channel between the segments. The rod 5 is received in the channel between the segments. The rod is inserted into the channel front (smaller) end first. As the rod is forced into the channel, the rod will urge the segments apart to form a tight interference fit between the segments 4. The rod 5 is forced into the channel until the segments are properly tightened When rods 5 are inserted in all the channels in a row of segments 4, the liner row will be tightly and securely formed.

As can be seen when comparing FIGS. 4 and 5, the clearance between the segments 4 (i.e. the distance between the edges 10 of adjacent segments) is not always the same. The use of the diamond shaped rod 5 allows the same rod to be used for more than one clearance and still form a tightly interfitting liner. When the clearance between the segments is larger, the rod can be inserted as shown in FIG. 4, with the larger of the width and height being generally horizontal. If the segments are closer together, as shown in FIG. 5, the rod 5 can be turned 90° from the orientation of FIG. 4 so that the smaller of the width and height is generally horizontal, as referenced in FIGS. 4 and 5. If a retention pin is designed for essentially only one clearance or separation distance, the retention pin must be made in several sizes, so that the varying clearances can be accommodated. By providing a pin, such as pin or rod 5, the inventory of pin sizes that must be produced can be drastically reduced.

As variations within the scope of the appended claims may be apparent to those skilled in the art, the foregoing description is set forth only for illustrative purposes and is not meant to be limiting.

I claim:

1. A tumbling unit constructed as a casting shake-out unit, rotary media drum, or sand reclaimer, the tumbling unit comprising:

a cylindrical outer shell;

a cylindrical liner positioned within said outer shell, said liner being formed of a series of interfitting segments, said segments having edges adjacent each other, the adjacent edges having a groove formed therein and extending the length of said edges, the grooves of adjacent segments defining a channel between adjacent segments; and a retaining rod received in said channel to urge adjacent segments apart to form a tight interfit among the segments in a row of said liner, said retaining rod having a front face, a back face, sides, and a height and a width; said sides being generally trapezoidal in shape and defining a taper such that said back face has a larger surface area than said front face; and wherein said height is greater than said width;

wherein said retaining rod is insertable in said channel in two positions depending on the clearance between said segments, said retaining rod being inserted in said channel in a first position in which said height of said rod is generally co-planar with said adjacent segments when the clearance between said segments is larger and said retaining rod being inserted in said channel in a second position in which said width of said rod is generally co-planar with said adjacent segments when the clearance between said segments is smaller.

2. The tumbling unit of claim 1 wherein said groove is generally triangularly shaped, said channel is generally diamond shaped, and said retaining rod is generally diamond shaped in cross-section.

3. The tumbling unit of claim 1 wherein said taper is a taper of about 2°.

4. The tumbling unit of claim 1 wherein the surface area of said back face is about 2.2 times the surface area of said front face.

5. The tumbling unit of claim 1 wherein said width of said rod is about 80%–85% of said height of said rod.

6. In combination, a pair of adjacent liner segments for a cylindrical tumbling unit and a retaining rod for forcing a tight interfit between the adjacent liner segments of the tumbling unit; said adjacent liner segments each having an adjacent edge, a generally triangular groove formed in said edge such that when said segments are adjacent each other, said triangular groove of each segment combine to form a generally diamond shaped channel; said retaining rod being generally diamond shaped in cross-section and having a front face, a back face, sides, and a height and a width,; said sides being generally trapezoidal in shape and defining a taper such that said back face has a larger surface area than said front face; and wherein said height is greater than said width;

wherein said retaining rod is insertable in said channel in two positions depending on the clearance between said segments, said retaining rod being inserted in said channel in a first position in which said height of said rod is generally co-planar with said adjacent segments when the clearance between said segments is larger and said retaining rod being inserted in said channel in a second position in which said width of said rod is generally co-planar with said adjacent segments when the clearance between said segments is smaller.

7. The combination of claim 6 wherein said taper is a taper of about 2°.

8. The combination of claim 6 wherein the surface area of said back face is about 2.2 times the surface area of said front face.

9. The combination of claim 6 wherein said width of said rod is about 80%–85% of said height of said rod.

10. The combination of claim 6 wherein said retaining rod has a length equal to or slightly less than the length of said groove.

* * * * *

UNITED STATES PATENT AND TRADEMARK OFFICE

CERTIFICATE OF CORRECTION

PATENT NO. : 5,638,887

DATED : June 17, 1997

INVENTOR(S) : Michael S. Didion

It is certified that error appears in the above-indentified patent and that said Letters Patent is hereby corrected as shown below:

Title page, item [73],

Please change name of Assignee from "Nidion Manufacturing Company" to ---Didion Manufacturing Company.

Signed and Sealed this

Twenty-sixth Day of August, 1997

*Attest:*

BRUCE LEHMAN

*Attesting Officer*

*Commissioner of Patents and Trademarks*